United States Patent [19]

Yasuda et al.

[11] 4,374,895

[45] Feb. 22, 1983

[54] ELECTROSTATIC RECORDING ELEMENT

[75] Inventors: Tokuro Yasuda; Keiji Yamauchi, both of Yonago, Japan

[73] Assignee: Oji Paper Co., Ltd., Tokyo, Japan

[21] Appl. No.: 277,210

[22] Filed: Jun. 25, 1981

Related U.S. Application Data

[63] Continuation-in-part of Ser. No. 69,556, Aug. 24, 1979, abandoned.

[30] Foreign Application Priority Data

| | | | |
|---|---|---|---|
| Aug. 31, 1978 | [JP] | Japan | 53-106397 |
| Aug. 31, 1978 | [JP] | Japan | 53-106398 |
| Feb. 13, 1979 | [JP] | Japan | 54-15346 |
| Feb. 26, 1979 | [JP] | Japan | 54-20712 |
| Feb. 27, 1979 | [JP] | Japan | 54-21368 |

[51] Int. Cl.[3] ........................ B32B 5/16; G01D 15/34

[52] U.S. Cl. .................................. 428/328; 162/138; 346/135.1; 346/153.1; 427/121; 428/206; 428/207; 428/211; 428/341; 428/342; 428/511; 428/514; 428/537

[58] Field of Search ............................ 162/138; 204/2; 252/518; 346/135.1, 153; 427/121; 428/206–211, 323, 328, 341, 342, 511–514, 537, 697, 702, 913, 914

[56] References Cited

U.S. PATENT DOCUMENTS

| | | | |
|---|---|---|---|
| 3,861,954 | 1/1975 | Funderburk | 346/135.1 |
| 3,956,571 | 5/1976 | Takao et al. | 427/121 |
| 4,042,936 | 8/1977 | Yoshikawa | 346/135.1 |
| 4,173,677 | 11/1979 | Nakano et al. | 427/121 |

FOREIGN PATENT DOCUMENTS

| | | | |
|---|---|---|---|
| 53-18891 | 6/1978 | Japan | 427/121 |
| 53-18892 | 6/1978 | Japan | 427/121 |

*Primary Examiner*—Bruce H. Hess
*Attorney, Agent, or Firm*—Armstrong, Nikaido, Marmelstein & Kubovcik

[57] ABSTRACT

An electrostatic recording element which is capable of forming clear images thereon independently from the temperature and humidity of the ambient atmosphere, and of being stored for a long period of time without deterioration thereof, which comprises:

(a) a substrate comprising paper or a synthetic polymer film;

(b) a conductive layer located on a surface of said substrate and comprising (1) powdered electroconductive zinc oxide which has been doped with a member selected from the group consisting of aluminium, copper and tin, and which has a specific resistivity of from $1\times10^{-1}$ to $1\times10^{2}$ ohm-cm, under a pressure of 150 kg/m$^2$, (2) an organic fluorescent brightening agent in an amount of from 0.1 to 2.0%, based on the weight of said electroconductive zinc oxide, and (3) a binding material uniformly mixed with the electroconductive zinc oxide and the organic fluorescent brightening agent; and (c) a dielectric layer located on the conductive layer and having an electrostatic recording surface.

15 Claims, 2 Drawing Figures

ELECTROSTATIC RECORDING ELEMENT

The present application is a continuation-in-part application from the application Ser. No. 069,556 filed on Aug. 24, 1979, and now abandoned.

FIELD OF THE INVENTION

The present invention relates to an electrostatic recording element. More particularly, the present invention relates to an electrostatic recording element capable of clearly forming images thereon independently of atmospheric humidity and temperature

BACKGROUND OF THE INVENTION

It is known that a conventional electrostatic recording element is provided with a substrate, such as paper, a conductive layer located on a surface of the substrate and containing a cationic or anionic polyelectrolyte substance, and a dielectric layer with an electrostatic recording surface. This type of conventional electrostatic recording element is useful for forming clear electrostatic images on the recording surface under ordinary atmospheric conditions. However, since the cationic or anionic polyelectrolyte substance highly hydrophilic, the conventional recording element exhibits the following disadvantages.

1. In an ambient atmosphere having a low temperature of, for example, 20° C. or less, and/or a low humidity of, for example, 30% RH or less, the cationic or anionic polyelectrolyte substance exhibits a very low degree of electrolysis, which causes the conductive layer to exhibit a very low conductivity, and therefore, the recording element cannot form clear electrostatic images thereon. Accordingly, during the winter seasons in the cold and temperate latitudes, the quality of the clearness of the electrostatic images on the recording surface becomes poor and, sometimes, the background of the images is soiled.

2. In another ambient atmosphere having a high temperature of, for example, 30° C. or more and/or a high humidity of, for example, 75% RH or more, the polyelectrolyte substrate absorbs moisture from the ambient atmosphere and migrates into the substrate and/or the dielectric layer, which causes the conductivity of the conductive layer to be excessively high and the resolution power of the recording element to be very poor. Accordingly, during the summer season in the temperate latitudes and during the rainy season in the tropical latitudes, the images formed on the recording element are frequently unclear and/or deformed In order to eliminate the above-mentioned disadvantages from the conventional electrostatic recording element, attempts have been made to replace the cationic or anionic polyelectrolyte substance with an electron electro-conductive agent, such as metals, for example, powered stainless steel, silver and copper, carbon black, electroconductive stannic oxide and titanium dioxide, and copper iodide. However, the powdered metals are disadvantageous in that the resultant recording element is undesirably colored and some of the metals per se are toxic or harmful to the human body. The carbon black causes the resultant recording element to be significantly colored. The electroconductive stannic oxide tends to corrode some metallic material and is very expensive. The electroconductive titanium dioxide exhibits a relatively high specific resistivity, undesirably colors the recording element and is very expensive. Moreover, the copper iodide is highly unstable so that the conductivity of the resultant conductive layer alters with changes in the ambienet atmospheric humidity and temperature, and is deteriorated during a long period of storage. Also, the copper iodide exhibits a toxicity to the human body and is corrosive to some metallic materials. Furthermore, the copper iodide causes the resultant recording element to be undesirably colored.

SUMMARY OF THE INVENTION

An object of the present invention is to provide an electrostatic recording element which is capable of forming clear images thereon independently of the ambient atmospheric humidity and temperature.

Another object of the present invention is to provide an electrostatic recording element having a white or very slightly colored conductive layer.

Still another object of the present invention is to provide an electrostatic recording element having a conductive layer which is harmless to the human body.

A further object of the present invention is to provide an electrostatic recording element with a quality which can be maintained without deterioration for a long period of time.

The above-mentioned objects can be attained by the electrostatic recording element of the present invention which comprises:

(a) a substrate comprising paper or a synthetic polymer film;

(b) a conductive layer located on a surface of said substrate and comprising (1) powdered electroconductive zinc oxide which has been doped with a member selected from the group consisting of aluminium, copper and tin, and which has a specific resistivity of from $1\times10^{-1}$ to $1\times10^{2}$ ohm-cm, under a pressure of 150 kg/cm$^2$, (2) an organic fluorescent brightening agent in an amount of from 0.1 to 2.0%, based on the weight of said electroconductive zinc oxide, and (3) a binding material uniformly mixed with the electroconductive zinc oxide and the organic fluorescent brightening agent; and (c) a dielectric layer located on the conductive layer and having an electrostatic recording surface.

It is important that the conductive layer contains the organic fluorescent brightening agent which is effective for enhancing the electroconductivity of the electroconductive zinc oxide.

The most preferable binding material in the conductive layer contains at least one member selected from the group consisting of sodium salts and sodium ammonium salts of styrene-maleic acid copolymers and styrene-maleic acid-maleic ester terpolymers.

Furthermore, an intermediate layer consisting of a film-forming organic material may be provided between the conductive layer and the dielectric layer. This intermediate layer is effective for preventing the undesirable penetration of the electroconductive substance from the dielectric layer into the conductive layer.

DETAILED DESCRIPTION OF THE INVENTION

Figure 1:
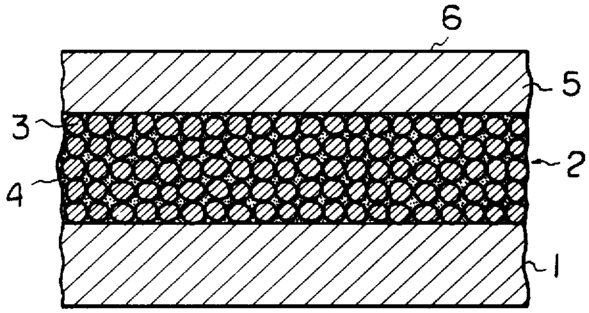
FIG. 1 is an explanatory cross-sectional view of an embodiment of the electrostatic recording element of the present invention.

The electrostatic recording element of the present invention can be prepared by coating a surface of a substrate, for example, paper, with a mixture of powdered electroconductive zinc oxide having a specific resistivity of from $1\times10^{-1}$ to $1\times10^{2}$ ohm-cm, under a pressure of 150 kg/cm$^2$, with an organic fluorescent brightening agent and a binding material so as to form a conductive layer and, then, by forming a dielectric layer having an electrostatic recording surface thereof on the conductive layer. The electrostatic recording element of the present invention exhibits an excellent capability of forming clear electrostatic images thereon not only in ordinary atmospheric temperature and humidity but, also, in unusual atmospheric conditions involving, for example, a low temperature of 10° C. or less and a low humidity of 5% RH or less, or a high temperature of 30° C. or more and a high humidity of 90% RH or more. The electrostatic recording element of the present invention can create clear electrostatic images thereon even immediately after it is dried in a hot air dryer at a temperature of 60° C., for 10 hours, so that it is completely dried throughout.

The powdered electroconductive zinc oxide usable for the present invention exhibits a very low specific resistivity of $1\times10^{-1}$ to $1\times10^{2}$ ohm-cm, under a pressure of 150 kg/cm$^2$. Generally, the value of the specific resistivity of the powdered electroconductive zinc oxide becomes slightly reduced with an increase in the pressure applied to the powdered zinc oxide. This electroconductive zinc oxide can be prepared by doping ordinary powdered zinc oxide with another metal, for example, aluminum, copper, and tin, so as to create a lattice defect in the zinc oxide crystal lattice. The resultant electroconductive zinc oxide is usually in the form of white or light gray fine particles, preferably, having an average size of 5 microns or less, and has the same stability as that of ordinary photoconductive zinc oxide, which usually exhibits a specific resistivity of more than $1\times10^{2}$ ohm-cm, for example, $1\times10^{10}$ to $1\times10^{12}$ ohm-cm, under a pressure of 150 kg/cm$^2$.

The conductive layer in the electrostatic recording element of the present invention contains an organic fluorescent brightening agent uniformly mixed with the electroconductive zinc oxide and the binding material. The content of the organic fluorescent brightening agent in the conductive layer is preferably in a range of from 0.1 to 2.0% based on the weight of the electroconductive zinc oxide.

The organic fluorescent brightening agent contained in the conductive layer is effective for enhancing the conductivity of the conductive layer. Accordingly, the use of the organic fluorescent brightening agent allows the electroconductive zinc oxide in the conductive layer to be used in a small amount. Also, the organic fluorescent brightening agent is effective for optically whitening the recording element.

The organic fluorescent brightening agent usable for the present invention involves the following types of fluorescent dyes and pigment.

(1) Stilbene type fluorescent dyes having the following basic structures:

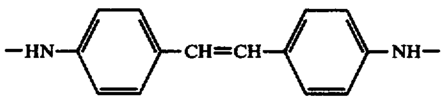

and

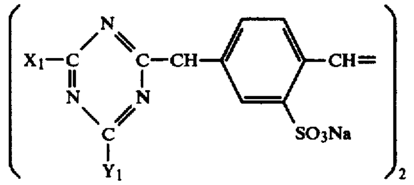

wherein $X_1$ represents a radical selected from the group consisting of

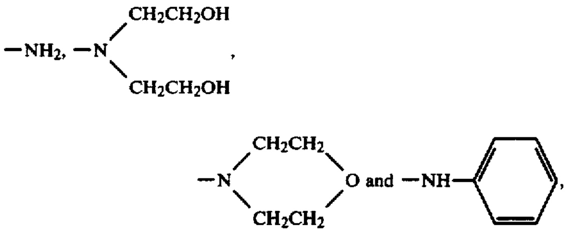

and $Y_1$ represents a radical selected from the group consisting of

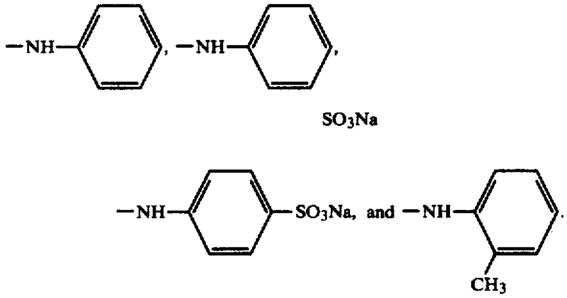

(2) Acylaminoureide type fluorescent dyes having the following basic structure:

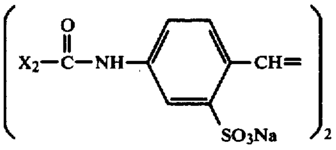

wherein $X_2$ represents a radical,

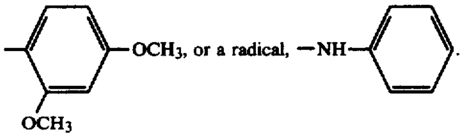

(3) Triazol type fluorescent dyes having the following basic structures.

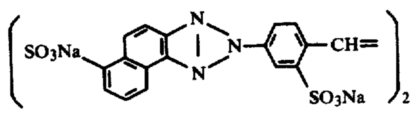

and

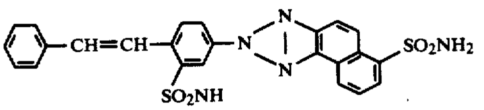

(4) Imidazol type fluorescent dyes having the following basic structure:

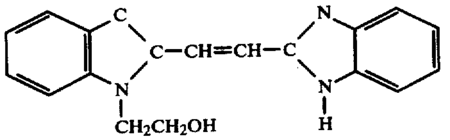

(5) Pyrazoline type fluorescent dyes having the following basic structure:

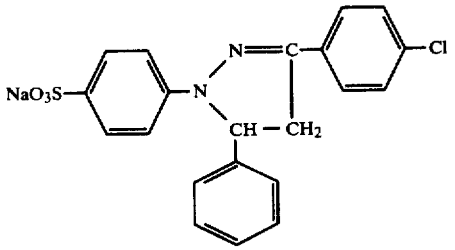

(6) Coumarin type fluorescent dyes having the following basic structure:

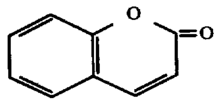

(7) Bis-oxazol type fluorescent dyes.

The binding material usable for the present invention may be selected from water-soluble polymeric material, for example, polyvinyl alcohol, starch, carboxymethyl cellulose and water-soluble salts thereof, styrene-maleic acid copolymers and water-soluble salts thereof, hydroxyethyl cellulose, isobutylene maleic acid copolymers and water-soluble salts thereof, gum arabic, oxidized starch, and styrene-maleic acid-maleic ester terpolymers and water-soluble salts thereof, and organic solvent-soluble polymeric materials, for example, styrene-butadiene rubbers, polyacrylic esters, polyvinyl acetate, polyvinyl chloride and polyvinyl butyral. The water-soluble polymeric material is usually dissolved in water and the solution is mixed with the electroconductive zinc oxide and the fluorescent brightening agent so as to prepare a coating liquid. The organic solvent-soluble polymeric material is dissolved in an organic solvent, for instance, toluene, xylene, ethyl acetate and butyl acetate, and the solution is emulsified in water to form a latex, and then, the aqueous latex of the polymeric material and the fluorescent brightening agent are mixed with the electroconductive zinc oxide to prepare a coating liquid. Otherwise, the solution of the polymeric material in the organic solvent may be directly mixed with the electroconductive zinc oxide and the fluorescent brightening agent, and the mixture may be used as a coating liquid.

In the conductive layer of the electrostatic recording element of the present invention, it is preferable that the binding material is selected from the group consisting of sodium salts and sodium ammonium salts of styrene-maleic acid copolymers and styrene-maleic acid-maleic ester terpolymers. It is preferable that the content of the maleic acid moieties in the above-mentioned copolymers and terpolymers is at least 30 molar %, more preferably, in a range of from 40 to 60 molar %. Also, in the case of the above-mentioned sodium ammonium salts, it is preferable that at least 50 molar %, more preferably, at least 30 molar % of the maleic acid moieties in the copolymers and terpolymers are in the form of the sodium salts thereof. In the content of the ammonium salts of the maleic acid moieties in the above-mentioned copolymers and terpolymers is more than 50 molar %, the copolymers and terpolymers may cause the resistivity of the resultant conductive layer to be increased at an elevated temperature. This phenomenon is derived from the fact that a portion of the ammonium salts of the above-mentioned maleic acid copolymers and terpolymers is cross-linked at an elevated temperature, and the cross-linking bonds hinder the movement of electrons in the copolymers and terpolymers.

The above-mentioned sodium salts and sodium ammonium salts of the maleic acid copolymers and terpolymers are effective for causing the resultant conductive layer to exhibit a proper surface resistivity of less than $10^9$ ohm, and for maintaining the surface resistivity of the resultant conductive layer in a proper level over a long period of storage, even if the conductive layer is exposed to an unusually high or low humidity.

The maleic ester moiety in the above-mentioned terpolymers may be selected from the group consisting of methyl maleate, ethyl maleate, butyl maleate and 2-ethylhexyl maleate moieties.

The coating liquid can be prepared by mixing the powdered electroconductive zinc oxide and the fluorescent brightening agent with the solution or latex of the binding material in a conventional mixer, for example, ball mill, attritor sand mill or paint conditioner, until the average size of the electroconductive zinc oxide particles becomes 5 microns or less.

In the preparation of the coating liquid, the fluorescent brightening agent may be admixed with a mixture which has been prepared by mixing powdered electroconductive zinc oxide with a solution or latex of the binding material in a mixer; or the fluorescent brightening agent may be mixed with the electroconductive zinc oxide and the solution or latex of the binding material in one single operation in the mixer.

After applying the above-mentioned coating liquid onto a surface of the substrate, the resultant layer of the coating liquid is solidified by evaporating away the water and/or the organic solvent.

The content of the electroconductive zinc oxide in the conductive layer is not limited to a special value, as long as the electroconductive zinc oxide particles distributed in the binding material can connect with each other to form a body of electroconductive film in the conductive layer. Generally, the larger the content of the electroconductive zinc oxide in the conductive layer, the higher the conductivity and the brittleness of the conductive layer. Accordingly, it is preferable that the ratio in weight of the electroconductive zinc oxide to the binding material in the conductive layer be in a range of from 50:50 to 95:5, more preferably, 70:30 to 85:15.

The amount of the conductive layer formed on the substrate is not limited to a special value, as long as the conductive layer exhibits a proper surface resistivity of, for example, $1\times10^6$ to $1\times10^8$ ohm, for forming clear electrostatic images on the recording surface. Usually, in the case where the substrate consists of paper, it is preferable that the conductive layer has a weight of from 2 to 18 g/m$^2$, more preferably, from 8 to 14 g/m$^2$.

The substrate in the electrostatic recording element of the present invention may consist of paper or a synthetic polymer film, for example, polyethylene terephthalate film, polyethylene film, polypropylene film, polyvinyl acetate film, polyvinyl chloride film and polyvinylidene chloride film.

The dielectric layer comprises at least one dielectric polymeric material selected from the group consisting of polyacrylic ester resins, polymethacrylic ester resins, polyvinyl acetate resins, vinyl chloride-vinyl acetate copolymer resins, polyvinyl butyral resins, polystyrene resins and silicone resins. The dielectric layer may contain a white inorganic pigment which consists of at least one member selected from the group consisting of calcium carbonate, titanium dioxide, clay and lithopone, and which is uniformly mixed, preferably, in an amount of 20 to 50% by weight, with the dielectric polymeric material.

The conductive layer in the electrostatic recording element of the present invention may contain a polyelectrolyte additive uniformly mixed with the electroconductive zinc oxide and the binding material. The polyelectrolyte additive may consist of at least one member selected from cationic or anionic polyelectrolyte compounds, and may be in an amount of from 5 to 50%, based on the weight of the electroconductive zinc oxide.

The cationic polyelectrolyte compound may be selected from the group consisting of polyelectrolyte primary, secondary, tertiary and quaternary ammonium salts, for example, polyethyleneimine hydrochloride, poly(N-methyl-4-vinylpyridium chloride), poly(2-methacryloxyethyl-trimethyl ammonium chloride), poly(N-acrylamidepropyl-3-trimethyl ammonium chloride), poly(N-methylvinylpyridium chloride), poly(N-vinyl-2,3-dimethyliminazolinium chloride), poly(diallylammonium chloride), poly(N,N-dimethyl-3,5-methylenepiperidinium chloride) and polyvinylbenzyltrimethyl ammonium chloride; polyelectrolyte sulfonium salts, for example, poly-(2-acryloxyethyl-dimethyl sulfonium chloride); and; polyelectrolyte phosphonium salts, for instance, poly(glycidyl-tributyl phosphonium chloride).

The anionic polyelectrolyte additive may be selected from the group consisting of polyelectrolyte carboxylate compounds, for example, polyacrylic acid, polymethacrylic acid, hydrolysis products of polyacrylic esters, hydrolysis products of polyacrylamides and hydrolysis products of polyacrylonitrile; polyelectrolyte sulfonate compounds, for instance, polystyrene sulfonates and polyvinyl sulfonate, and; polyelectrolyte phosphonate compound, for example, polyvinyl phosphonate.

The polyelectrolyte additive mixed with the electroconductive zinc oxide is effective for reducing the volume resistivity of the conductive layer and for preventing fogging of the images formed on the recording surface. Usually, the fogging of the images is generated by the formation of a number of lateral stripes around each image. The above-mentioned effect of the polyelectrolyte additive is based on such a phenomenon that in the preparation of the conductive layer on the substrate such as paper, a portion of the polyelectrolyte additive penetrates into a surface portion of the substrate. This penetration causes not only the surface resistivity to be reduced but, also, the volume resistivity of the combination of the conductive layer and the substrate to be reduced. The polyelectrolyte additive is also effective for reducing the resistivity of the matrix phase consisting of the binding material which per se is non-conductive.

Referring to FIG. 1, the electrostatic recording element of the present invention comprises a substrated 1, a conductive layer 2 containing the electroconductive zinc oxide particles 3 dispersed in a matrix 4 consisting of the binding material and the fluorescent brightening agent and a dielectric layer 5 having an electrostatic recording surface 6. Usually, the electrostatic recording element is required to be provided with not only the feature that the conductive layer 2 has a proper conductivity but, also, the following features.

1. The conductive layer 2 exhibits such a tenacity that a coating liquid for forming the dielectric layer 5 can be coated on the conductive layer 2 without breakage of the conductive layer 2.

2. The conductive layer 2 does not allow the coating liquid for the dielectric layer 5 to penetrate into the conductive layer 2.

Especially, it is important that the conductive layer 2 is not contaminated with the coating liquid for the dielectric layer 5. For this purpose, an intermediate layer may be inserted between the dielectric layer and the conductive layer.

Figure 2:
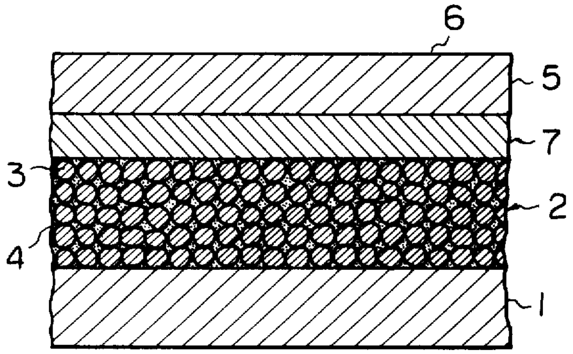
FIG. 2 is an explanatory cross-sectional view of another embodiment of the electrostatic recording element of the present invention.

Referring to FIG. 2, an intermediate layer 7 is located between the dielectric layer 5 and the conductive layer 2 and serves as a barrier for protecting the conductive layer from the coating liquid for the dielectric layer 5. The intermediate layer 7 is formed from a film-forming organic material which may comprise at least one member selected from the group consisting of styrene-butadiene copolymers, starch, polyvinyl alcohol, styrene-maleic acid copolymers, acrylic acid-acrylic ester copolymers, polyacrylic ester, casein, polyvinyl chloride and polyvinyl butyral.

The thickness of the intermediate layer is not limited to a special value. However, generally, it is preferable that the thickness of the intermediate layer is less than 10 microns, more preferably, from 1 to 5 microns, and the weight of the intermediate layer is in a range of from 1.0 to 5.0 g/m$^2$.

The specific examples presented below will serve to more fully explain how the present invention is practiced. However, it should be understood that these examples are only illustrative and in no way limit the scope of the present invention.

In the examples, the specific resistivity of the powdered electroconductive zinc oxide was determined by the following method.

A predetermined amount of a powdered electroconductive zinc oxide was placed between an upper electrode rod and a lower electrode rod, each of which had the same cross-sectional area, and pressed therebetween under a predetermined pressure. In this pressed condition, the resistivity of the layer of the powdered zinc oxide was measured. The specific resistivity $\phi$ of the powdered zinc oxide was calculated in accordance with the equation:

$$\phi = R \times S/l$$

wherein R is the measured resistivity of the electroconductive zinc oxide layer, S is a cross-sectional area of the electrode rods and l is a thickness of the layer of the powdered zinc oxide.

EXAMPLES 1 THROUGH 6 AND COMPARATIVE EXAMPLE 1

In each of the Examples 1 through 6 and Comparative Example 1, a coating liquid for forming a conductive layer was prepared by mixing, in a paint conditioner for 10 minutes, 100 g of the same powdered electroconductive zinc oxide having a specific resistivity of $2.0 \times 10^{-1}$ ohm-cm under a pressure of 150 kg/cm$^2$ and the average size of the zinc oxide particles not exceeding 5 microns, 125 g of a 20% aqueous solution of a sodium salt of styrene-maleic acid copolymer, 130 g of water and Kayaphol PAS Liquid, which is a trademark of a fluorescent brightening dye containing, as a main component, bistriazinylaminostilben sulfonic acid derivative and made by Nippon Kayaku Kogyo K.K., Japan, in an amount as indicated in Table 1.

The coating liquid was applied onto a surface of a substrate consisting of paper having a weight of 50 g/m$^2$ by using a Meyer type coating bar in such a manner that the dried conductive layer exhibited a weight of 120.5 g/m$^2$ and a surface resistivity as indicated in Table 1, at a temperature of 25° C. and a relative humidity of 45%.

TABLE 1

| | Example No. | Amount of Kayaphol PAS liquid (g) | Surface resistivity (ohm) |
|---|---|---|---|
| Comparative | Example 1 | 0 | $5.0 \times 10^7$ |
| Example | 1 | 0.1 | $3.0 \times 10^7$ |
| | 2 | 0.3 | $2.6 \times 10^7$ |
| | 3 | 0.5 | $1.2 \times 10^7$ |
| | 4 | 1.0 | $9.0 \times 10^6$ |
| | 5 | 1.7 | $7.5 \times 10^6$ |
| | 6 | 2.0 | $7.0 \times 10^6$ |

The conductive layer was smoothed by using a super calender so that the smoothed surface exhibited a Beck smoothness of 150 seconds.

A coating liquid for a dielectric layer was prepared by shaking a mixture of 90 g of a 40% solution of a polyacrylic butyl ester resin, 24 g of calcium carbonate and 86 g of toluene, by using a paint conditioner for 10 minutes. The coating liquid was applied onto the smoothed surface of the conductive layer in such manner that after drying, the resultant dielectric layer exhibited a weight of 7.0 g/m$^2$.

The resultant electrostatic recording element was subjected to an electrostatic recording operation by using a facsimile recording machine at a negative voltage of 700 volts to record a predetermined pattern of images on the element, after conditioning it at a temperature of 25° C., at a relative humidity as indicated in Table 2. The reflection density of the recorded images on the element is shown in Table 2.

TABLE 2

| Example No. | Relative humidity (%) | Reflection density of images |
|---|---|---|
| Comparative Example 1 | 20 | 0.85 |
| | 40 | 0.90 |
| | 60 | 0.85 |
| | 80 | 0.70 |
| 1 | 20 | 0.93 |
| | 40 | 1.00 |
| | 60 | 0.89 |
| | 80 | 0.74 |
| 2 | 20 | 0.95 |
| | 40 | 1.00 |
| | 60 | 0.90 |
| | 80 | 0.75 |
| 3 | 20 | 1.05 |
| | 40 | 1.08 |
| | 60 | 0.95 |
| | 80 | 0.75 |
| Example 4 | 20 | 1.05 |
| | 40 | 1.10 |
| | 60 | 0.93 |
| | 80 | 0.78 |
| 5 | 20 | 1.05 |
| | 40 | 1.10 |
| | 60 | 0.94 |
| | 80 | 0.79 |
| 6 | 20 | 1.04 |
| | 40 | 1.10 |
| | 60 | 0.94 |
| | 80 | 0.78 |

EXAMPLE 7

A coating liquid for a conductive layer was prepared by mixing 120 g of the same electroconductive zinc oxide as that described in Example 3, 20 g of a polyvinyl butyral resin, 700 mg of Mikephor TB conc, which is a trademark of a fluorescent brightening agent containing, as a main component, diaminostilben disulfonic acid derivative and made by Mitsui Toatsu Kogyo K.K., Japan, 130 g of toluene and 130 g of methylalcohol, by using a ball mill for 1 hour. The coating liquid was applied onto a surface of the same substrate as that described in Example 1 and dried at a temperature of 120° C., so as to form a conductive layer having a weight of 12 g/m$^2$. The resultant conductive layer exhibited a surface resistivity of $1.0 \times 10^7$ ohm at a temperature of 25° C. at a relative humidity of 45%.

It was found that when the Mikephor TB conc was omitted in the preparation of the conductive layer, the resultant comparative conductive layer had to have a large weight of 14.5 g/m$^2$ in order for it to exhibit the same surface resistivity as that of the above-mentioned conductive layer.

The conductive layer was smoothed by using a super calender, so that the calendered surface exhibited a Beck smoothness of 150 seconds. A dielectric layer having a weight of 8.0 g/m$^2$ was formed on the smoothed surface of the conductive layer by the same method as mentioned in Example 1.

The resultant recording element was subjected to the same recording operations as those mentioned in Example 3. It was found that clear images could be formed on the element even after conditioning it at 25° C. at 20%RH for 4 hours or at 25° C. at 80%RH for 4 hours.

EXAMPLE 8

A surface of a substrate consisting of paper having a weight of 52.3 $g/m^2$ was coated with a mixture of 400 g of a 60% aqueous dispersion of clay with 150 g of a 10% aqueous solution of polyvinyl alcohol, 90 g of a 50% aqueous emulsion of a vinyl acetate-acrylic butyl ester copolymer and 360 g of water, and then, dried at a temperature of 120° C., so as to provide a lower side layer having a weight of 10 $g/m^2$. A coating liquid for a conductive layer was prepared by mixing 110 g of the same electroconductive zinc oxide as that used in Example 3 with 140 g of a 20% aqueous solution of sodium salt of a styrene-maleic acid copolymer, 500 mg of Uvitex CF, which is a trademark of a fluorescent brightening agent containing, as a main component, 4,4'-diamino-stilben disulfonic acid derivative, and made by Ciba-Geigy, and 150 g of water, by using a ball mill for 1 hour. The opposite surface of the substrate was coated with the above-prepared coating liquid and, then, dried at a temperature of 120° C., so as to provide a conductive layer having a weight of 9 $g/m^2$. The conductive layer exhibited a surface resistivity of $8.0 \times 10^7$ ohm.

It was found that when the Uvitex CF was omitted in the preparation of the conductive layer, the resulting comparative conductive layer should have a high weight of 10.5 $g/m^2$ in order to exhibit the same surface resistivity, $8.0 \times 10^7$ ohm, as that of the above-mentioned conductive layer.

The conductive layer was smoothed by using a super calender, so that the smoothed surface exhibited a Beck smoothness of 200 seconds. A dielectric layer having a weight of 5 $g/m^2$ was formed on the smoothed surface by coating it with a coating liquid which had been prepared by the same method as that described in Example 1. The resultant recording element could form clear images thereof even after conditioning at 25° C., at 20%RH, for 4 hours or at 25° C., at 80%RH, for 4 hours.

EXAMPLE 9

A coating liquid was prepared by mixing 200 g of the same electroconductive zinc oxide as that used in Example 3 with 353 g of a 10% aqueous solution of polyvinyl alcohol, 1.2 g of Kayalight B, which is a trademark of a fluorescent brightening agent containing, as a main component, a coumarin derivative, and made by Nippon Kayaku Kogyo K.K., and 230 g of water, by using a ball mill for one hour. A surface of the same substrate as that used in Example 8 was coated with the above-prepared coating liquid, so as to provide a conductive layer having a weight of 9.5 $g/m^2$. The conductive layer exhibited a surface resistivity of $2.0 \times 10^7$ ohm.

It was found that in the preparation of a comparative conductive layer having a surface resistivity of $2.0 \times 10^7$ ohm, the omission of the Kayalight B caused the resultant comparative conductive layer to have a high weight of 12.0 $kg/m^2$. That is, the weight of the conductive layer of the present example is 2.5 $g/m^2$ smaller than that of the comparative conductive layer, whereas the surface resistivity of the conductive layer of the present invention is equal to that of the comparative conductive layer.

The same operation for providing a dielectric layer as that described in Example 8 was applied to the surface of the conductive layer after smoothing it by using a super calender, to such an extent that the smoothed surface exhibited a Beck smoothness of 150 seconds.

The resultant dielectric layer had a weight of 7.0 $g/m^2$. The electrostatic recording element thus prepared was suitable for forming clear images thereon even after conditioning it as 25° C., at 20%RH, for 4 hours or at 25° C., at 80%RH, for 4 hours.

We claim:

1. An electrostatic recording element comprising (a) a substrate comprising paper or a synthetic polymer film;

(b) a conductive layer located on a surface of said substrate and comprising (1) powdered electroconductive zinc oxide which has been doped with a member selected from the group consisting of aluminum, copper and tin, and which has a specific resistivity of from $1 \times 10^{-1}$ to $1 \times 10^2$ ohm-cm, under a pressure of 150 $kg/cm^2$, (2) an organic fluorescent brightening agent in an amount of from 0.1 to 2.0% based on the weight of said electroconductive zinc oxide, and (3) a binding material uniformly mixed with said electroconductive zinc oxide and said organic fluorescent brightening agent; and (c) a dielectric layer located on said conductive layer and having an electrostatic recording surface.

2. An electrostatic recording element as claimed in claim 1, wherein the ratio in weight of said powdered electroconductive zinc oxide to said binding material is in a range of from 50:50 to 95:5.

3. An electrostatic recording element as claimed in claim 1, wherein said conductive layer has a weight of from 2 to 25 $g/m^2$.

4. An electrostatic recording element as claimed in claim 1, wherein said powdered electroconductive zinc oxide is in the form of fine particles having an average size of 5 microns or less.

5. An electrostatic recording element as claimed in claim 1, wherein said binding material is selected from the group consisting of polyvinyl alcohol, starch, carboxymethyl cellulose and water-soluble salts thereof, styrene-maleic acid copolymers and water-soluble salts thereof, hydroxyethyl cellulose, styrene-butadiene rubbers, polyacrylic esters, polyvinyl acetate, isobutylene-maleic acid copolymers, and water-soluble salts thereof, gum arabic, polyvinyl chloride, polyvinyl butyral, oxidized starch, and styrene-maleic acid-maleic ester terpolymer and water-soluble salts thereof.

6. An electrostatic recording element as claimed in claim 1, wherein said conductive layer contains a polyelectrolyte additive uniformly mixed with said electroconductive zinc oxide, said fluorescent brightening agent and said binding material, said polyelectrolyte being in an amount of from 5 to 50%, based on the weight of said electroconductive zinc oxide.

7. An electrostatic recording element as claimed in claim 6, wherein said polyelectrolytic additive consists of at least one cationic polyelectrolyte compound.

8. An electrostatic recording element as claimed in claim 7, wherein said cationic polyelectrolyte compound is selected from the group consisting of polyelectrolyte primary, secondary, tertiary and quaternary ammonium salts, polyelectrolytic sulfonium salts and polyelectrolyte phosphonium salts.

9. An electrostatic recording element as claimed in claim 6, said polyelectrolyte additive consisting of at least one anionic polyelectrolyte.

10. An electrostatic recording element as claimed in claim 9, wherein said polyelectrolyte additive is selected from the group consisting of polyelectrolyte carboxylate, sulfonate and phosphonate compounds.

11. An electrostatic recording element as claimed in claim 1, wherein said binding material in said conductive layer contains at least one member selected from the group consisting of sodium salts, and sodium ammonium salts of styrene-maleic acid copolymers and styrene-maleic acid-maleic ester terpolymers.

12. An electrostatic recording element as claimed in claim 1, wherein said substrate has an opposite surface impregnated or coated with a polyelectrolyte additive.

13. An electrostatic recording element as claimed in claim 1, wherein between said conductive layer and said dielectric layer, an intermediate layer comprising a film-forming organic material is located.

14. An electrostatic recording element as claimed in claim 13, wherein said film-forming organic material comprises at least one member selected from the group consisting of styrene-butadiene copolymers, starch, polyvinyl alcohol, styrene-maleic acid copolymers, polyacrylic esters acrylic acid-acrylic esters copolymers, casein, polyvinyl chloride and polyvinyl butyral.

15. An electrostatic recording element as claimed in claim 1, wherein said dielectric layer comprises a dielectric polymer selected from the group consisting of acrylic ester polymers, methacrylic ester polymers, polyvinyl acetate, vinyl chloride-vinyl acetate copolymers, polyvinyl butyral, polystyrene and silicone resins.

* * * * *